US008520980B2

(12) United States Patent
Oh et al.

(10) Patent No.: US 8,520,980 B2
(45) Date of Patent: Aug. 27, 2013

(54) IMAGE SEARCHING METHOD AND APPARATUS

(75) Inventors: Weon Geun Oh, Daejeon (KR); Won Keun Yang, Daejeon (KR); Ayoung Cho, Daejeon (KR); Dong Seok Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 488 days.

(21) Appl. No.: 12/648,803

(22) Filed: Dec. 29, 2009

(65) Prior Publication Data

US 2010/0239163 A1 Sep. 23, 2010

(30) Foreign Application Priority Data

Mar. 19, 2009 (KR) ........................ 10-2009-0023517

(51) Int. Cl.
*G06K 9/54* (2006.01)
*G06K 9/60* (2006.01)
*G06K 9/00* (2006.01)

(52) U.S. Cl.
USPC ......................................... 382/305; 382/165

(58) Field of Classification Search
USPC .................................. 382/162, 165, 298, 305
See application file for complete search history.

(56) References Cited

U.S. PATENT DOCUMENTS

| | | | | |
|---|---|---|---|---|
| 6,486,981 | B1 * | 11/2002 | Shimura et al. | ............... 358/500 |
| 7,466,856 | B2 * | 12/2008 | Kim et al. | ...................... 382/162 |
| 7,499,585 | B2 | 3/2009 | Choi et al. | |
| 2003/0198381 | A1 * | 10/2003 | Tanaka et al. | ................. 382/166 |
| 2004/0066966 | A1 * | 4/2004 | Schneiderman | ............... 382/159 |
| 2004/0170318 | A1 * | 9/2004 | Crandall et al. | .............. 382/165 |
| 2006/0288006 | A1 | 12/2006 | Eschbach et al. | |
| 2007/0132765 | A1 * | 6/2007 | Lee et al. | ....................... 345/473 |

FOREIGN PATENT DOCUMENTS

| | | |
|---|---|---|
| KR | 10-2004-0057749 | 7/2004 |
| KR | 10-2004-0079637 | 9/2004 |
| KR | 10-2008-0088778 | 10/2008 |

OTHER PUBLICATIONS

Yang et al., "A Fast Image Retrieval System Using Lookup Table on Mobile Device," Dec. 8-11, 2008, ICRP 2008, pp. 1-4.*
Belaroussi et al.."A Real Time Fingers Detection by Symmetry Transform Using a Two Cameras System," 2008, ISVC 2008, pp. 704-712.*
Junyeong Yang, et al., "A Fast Image Retrieval System Using Lookup Table on Mobile Device," ICRP 2008, 19th International Conference on Pattern Recognition, pp. 1-4, Dec. 8-11, 2008.

* cited by examiner

*Primary Examiner* — John Strege
(74) *Attorney, Agent, or Firm* — Staas & Halsey LLP

(57) ABSTRACT

An image searching method includes: resizing an input image in question; generating 3D image identifiers for the resized input image in question; and performing an image search for the input image in question by using the 3D image identifiers. Said resizing an input image includes: extracting a black-and-white image and a color image from the input image in question; resizing the black-and-white image; and resizing the color image. Said generating 3D image identifiers includes: extracting an MGST feature of the input image in question; extracting an angular partition feature of the input image in question; and extracting a color feature of the input image in question. Further, said performing an image search includes: calculating similarity between representative colors of the input image in question and a reference image; and if the similarity is above a predetermined level, matching the 3D image identifiers for the two images.

18 Claims, 5 Drawing Sheets

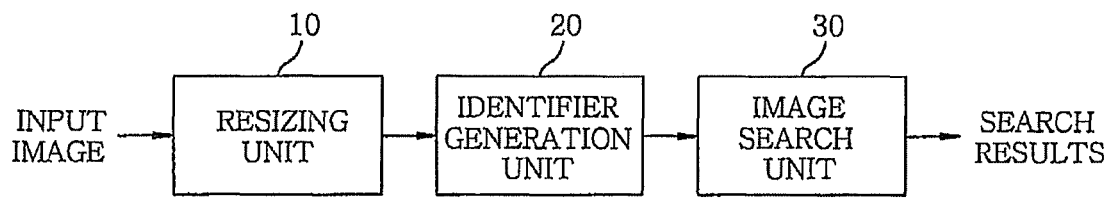
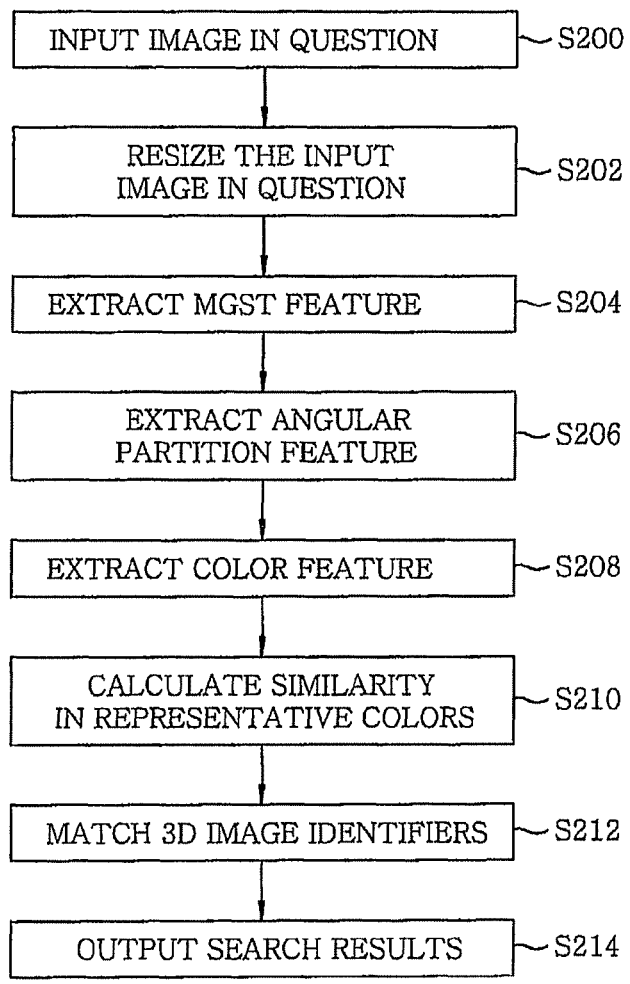

IMAGE SEARCHING METHOD AND APPARATUS

CROSS-REFERENCE(S) TO RELATED APPLICATION

The present invention claims priority of Korean Patent Application No. 10-2009-0023517, filed on Mar. 19, 2009, which is incorporated herein by reference.

FIELD OF THE INVENTION

The present invention relates to image search, and more specifically, to a method and an apparatus for searching images from digital contents such as UCC (User Created Contents) including diverse geometrical transformation, by generating 3D image identifiers of a 3D histogram structure, which is the combination of an MGST (Modified Generalized Symmetry Transform) feature, an angular partition feature and a color feature, and matching between 3D image identifiers.

BACKGROUND OF THE INVENTION

Recently, with an increasing demand for digital contents, a large amount of multimedia contents such as video, music, image and the like has been continuously created, distributed and served. Among them, images that are created or processed and edited by a user alone are particularly called UCC images. The use of such UCC images has been explosively increased, keeping abreast with the supply of portable digital cameras of high performance, the supply of large-capacity storage devices or portable storage media, and price drops thereof.

An UCC image searching technique issued to date generally requires to input text form-metadata of a desired image through a browser of a desk top PC or a portable terminal.

However, UCC images may lose their original features associated with a size, contents, a form or a quality of the images due to Internet or reproduction devices under different setups or through contents processing, re-edition, composition or the like conducted by users. In this case, although pre-input information such as metadata, identifier or the like for the original contents may have been known, it is impossible to search newly transformed contents because there is no additional metadata or ID information about them.

SUMMARY OF THE INVENTION

Therefore, the present invention provides a method for searching images, which involves generation of 3D image identifiers as an original feature of an image and matching between 3D image identifiers to search an original image digital contents such as UCC or the like particularly when the original image has experienced geometrical transformations such as image cutting, shift, size change, rotation and the like and thus has no metadata.

In accordance with an aspect of the present invention, there is an image searching method, including: resizing an input image in question; generating 3D image identifiers for each pixel in the resized input image in question; and performing an image search for the input image in question by using the 3D image identifiers.

In accordance with another aspect of the present invention, there is provided an image search apparatus, including: a resizing unit for changing a size of an input image in question; an identifier generation unit for generating 3D image identi- fiers for the resized input image in question; and an image search unit for performing an image search for the input image in question by using the 3D image identifiers.

BRIEF DESCRIPTION OF THE DRAWINGS

The above and other objects and features of the present invention will become apparent from the following description of preferred embodiments, given in conjunction with the accompanying drawings, in which:

FIG. 1 is shows a configuration of a UCC image search apparatus with 3D image identifiers in accordance with an embodiment of the present invention;

FIG. 2 illustrates an operational flow for image searching with 3D image identifiers in accordance with an embodiment of the present invention;

DETAILED DESCRIPTION OF THE EMBODIMENT

Hereinafter, the operational principle of the present invention will be described in detail with reference to the accompanying drawings which form a part hereof.

FIG. 1 is shows a configuration of a UCC image search apparatus with 3D image identifiers in accordance with an embodiment of the present invention.

The UCC image search apparatus includes a resizing unit 10 for changing a size of an input image in question; an identifier generation unit 20 for generating 3D image identifiers for the resized input image in question; and an image search unit 30 for searching an image by using the 3D image identifiers. Hereinafter, a UCC image searching process performed in the UCC image search apparatus will be described with reference to FIG. 2.

FIG. 2 is a flow chart showing UCC image search with 3D image identifiers in accordance with an embodiment of the present invention.

First, when an image in question is input as a target image to be searched in step S200. Resizing is then performed in step S202 to generate 3D image identifiers for each pixel in the input image in question. In this regard, numerous images stored in a storage device, such as a hard disk in a computer or gathered from any image storage device such as CD, DVD and the like may be any one of the target image in question.

That is, in order to generate 3D image identifiers from the input image in question, resizing needs to be performed first on the input image in question, aiming to acquire the image size of, e.g., 256×N in pixel after resizing. Here, the shorter side between a width and a length of the input image in question is set to 256, and the other is either enlarged or cut down depending on the proportion of the input image in question.

In addition, since features used in the 3D histogram are values calculated individually for color and black-and-white images, resizing of images needs also to be performed individually for color and black-and-white images. First, a black-and-white image of the input image in question is prepared to get a resized black-and-white image. To this end, RGB to YUV conversion is performed to extract luminance. Equation. 1 below denotes a conversion equation for extracting a luminance.

$$\text{Luminance} = 0.299R + 0.587G + 0.114B \quad \text{Eq. 1}$$

Next, the prepared black-and-white image is resized to a preset size by bi-cubic interpolation. To make a resized color image, the input image is then divided into three channel (Red, Green, and Blue) images and the bi-cubic interpolation is applied to each of the channel images to resize them to the preset size. After that, the resized channel images are matched with each other again to make a resized color image.

As described above, after resizing the input image in question, in step S204, an MGST (Modified Generalized Symmetry Transform) feature, which is one of 3D image identifiers used for searching an image from the resized input image in question, is extracted.

Figure 3:
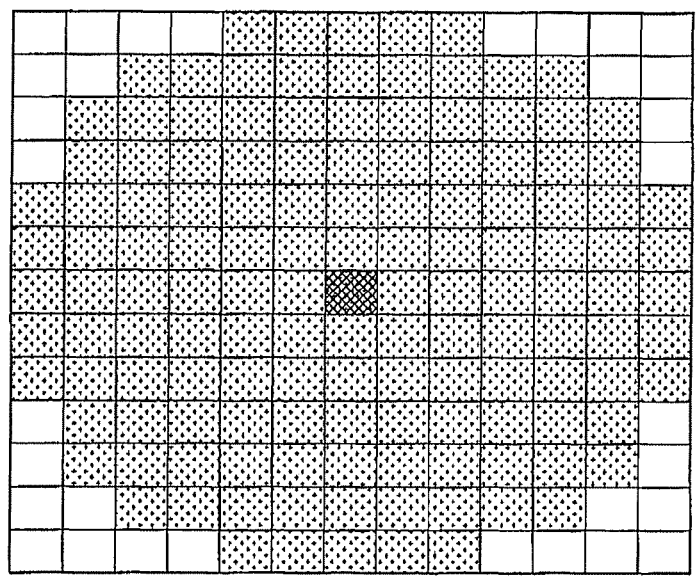
FIG. 3 presents a schematic view of MGST feature of an image in accordance with the embodiment of the present invention.

The following is an explanation of a way of extracting MGST feature. MGST is the transformation for calculating the symmetry magnitude value in an area. To apply the symmetry transformation, an area is set based on a pixel (e.g., 13×13 pixels), as shown in FIG. 3.

Figure 4:
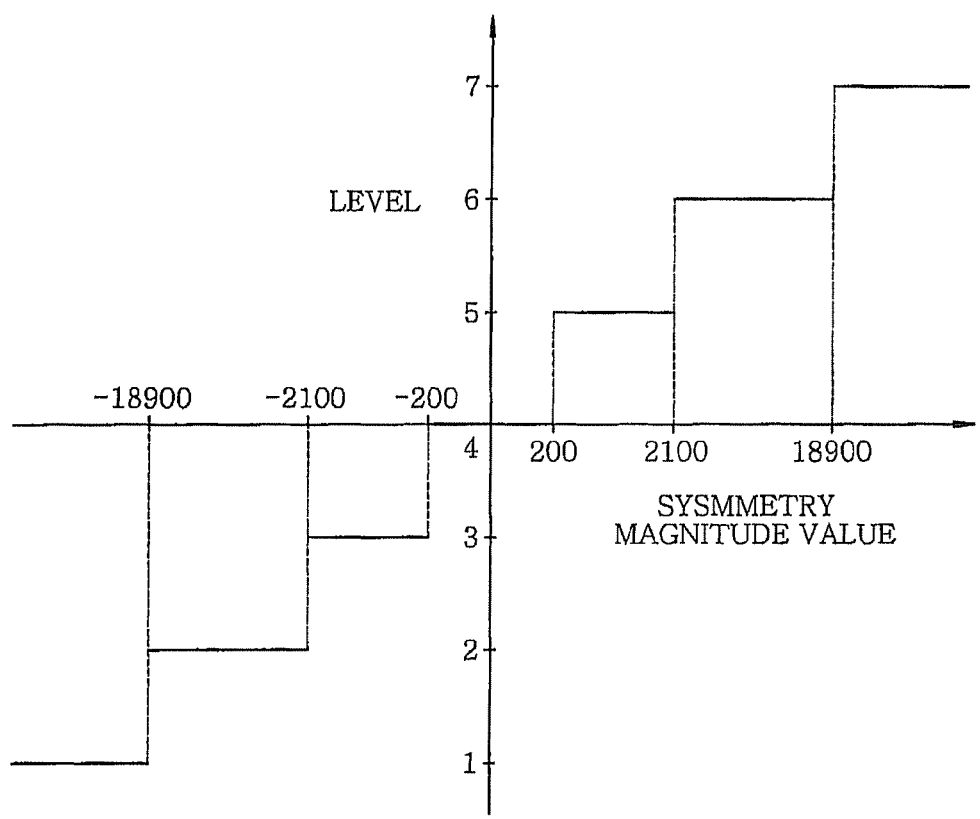
FIG. 4 depicts an example of MGST feature quantization in accordance with the embodiment of the present invention.

Next, a total 68 pixel pairs symmetrically disposed about the central pixel in the area are classified, and each of the pixel pairs is subjected to the symmetry transform as shown in Equation 2 below:

$$C_{ij} = D_{ij} P_{ij} v_i v_j \quad \text{Eq. 2}$$

wherein i and j are two pixels in a pair, and the symmetry magnitude value $C_{ij}$ of the pixel pair is calculated by multiplying distance weight function $D_{ij}$, phase weight function $P_{ij}$ and volumes of two pixels $v_i$, $v_j$. The distance weight function $D_{ij}$ is defined as Equation 3 below:

$$D_{ij} = \frac{1}{\sqrt{2\pi\sigma}} e^{-\frac{\|i-j\|}{2\sigma}} \quad \text{Eq. 3}$$

wherein σ is a size of an area where the symmetry transform takes place. Further, the phase weight function $P_{ij}$ is calculated by Equation 4 below:

$$P_{ij} = \sin\left(\frac{\theta_j + \theta_i}{2} - \alpha_{ij}\right)\sin\left(\frac{\theta_j - \theta_i}{2}\right) \quad \text{Eq. 4}$$

wherein $\theta_i$ and $\theta_j$ represent the direction of contour at i and j, respectively, and $\alpha_{ij}$ represents the angle between the straight line connecting two pixels and the horizontal line. Volume of each pixel, v, is calculated by Equation 5 below:

$$v = 0.266 \times 4 \times r^2 \times (g-g')/12 \quad \text{Eq. 5}$$

wherein r is a size of an area used for calculating the volume, g is a pixel value of the central pixel, and g' is an average pixel value of the pixels at a distance r from the center. The symmetry magnitude value is calculated for each of the 68 pixel pairs, and the final symmetry magnitude value in the area is an accumulated value of the degrees of symmetry of 68 pixel pairs. The symmetry magnitude value so calculated is divided into 7 levels by the quantization function as shown in FIG. 4.

After the MGST feature is extracted from the resized input image in question as described above, in step S206, an angular partition feature, which is one of 3D image identifiers used for searching an image from the resized input image in question, is extracted.

Figure 5:
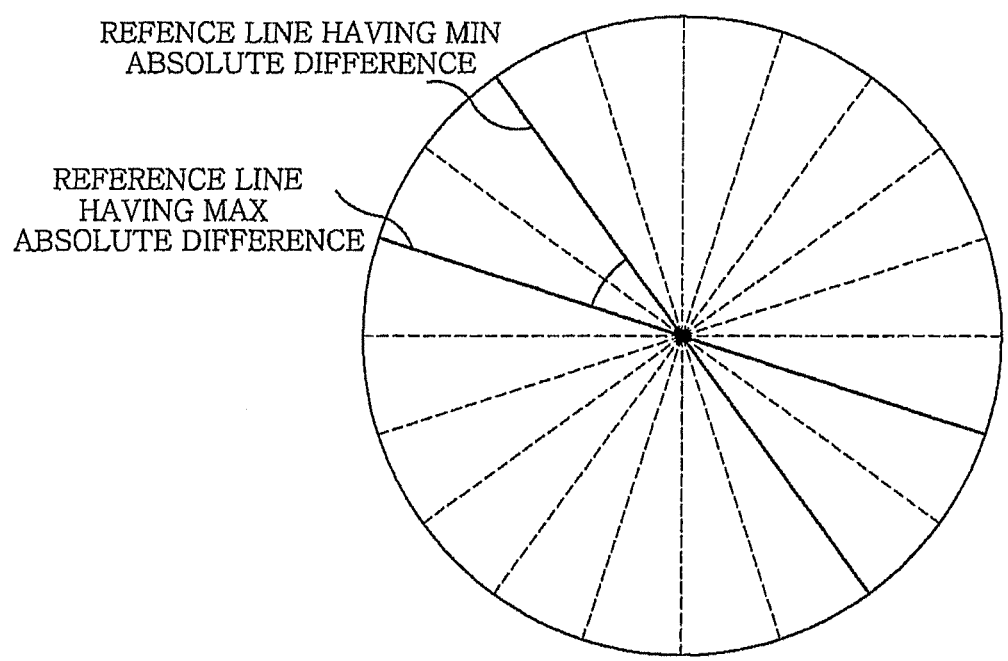
FIG. 5 offers a schematic view of angular partition feature of an image in accordance with the embodiment of the present invention.

The following is an explanation of a way of extracting the angular partition feature, in which a feature within a local area with radius r for each pixel in the input image in question is calculated. That is, as shown in FIG. 5, the reference line dividing the circle in half shifts 18 degrees each time, and an average pixel value with the weight of the semicircle is obtained. At this time, the weight varies depending on the distance from the center, and an absolute difference HCD(j) for the average value of two semicircles is calculated by Equation 6 below, while making a shift of degrees each time. Out of 10 calculated absolute differences, an acute angle of the reference line having a maximum value and a minimum value calculated therefrom is obtained.

$$HCD(j) = |HC_1(j) - HC_2(j)|, (1 \leq j \leq 10) \quad \text{Eq. 6}$$

wherein $HC_1$ and $HC_2$ are average pixel values of two semicircles.

Here, if the difference between the maximum and minimum absolute differences is smaller than 10, the local area is regarded as a flat area without any angular feature, which has an average pixel value instead of the angular feature. At this time, the average pixel value is quantized to 8 levels, and because the angular feature AP(x,y) is calculated in areas partitioned by 18 degrees, it may have values in 5 levels as shown in Equation. 7 below. Accordingly, the angular partition feature is formed of a total of 13 levels.

$$AP(x,y) = HC_1 + HC_2/2 \text{ (if MAX}_{HDC} - \text{MIN}_{HDC} < 10), \theta \text{ (otherwise)}, \quad \text{Eq. 7}$$

where $\text{MAX}_{HDC}$ is a maximum absolute difference, $\text{MIN}_{HDC}$ is a minimum absolute difference, and $\theta \in \{18, 36, 54, 72, 90\}$.

After extracting the angular partition feature from the resized input image in question as described above, in step S208, a color feature, which is one of 3D image identifiers used for searching an image from the resized input image in question, is extracted.

The following is an explanation of a way for extracting the color feature, in which an average RGB in a 3×3 area with each pixel of the input image in question in the center is obtained and segmented for mapping to hue in HSI (hue saturation intensity) color space. The lookup table for conversion of RGB to hue is created by the procedure shown in FIGS. 6A and 6B.

Figure 6A:
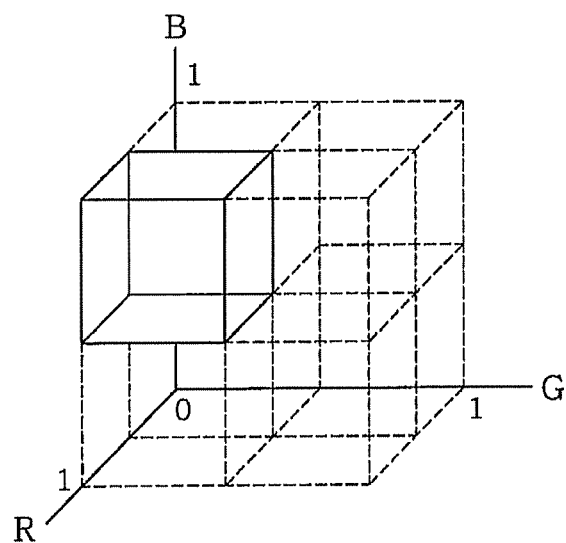
FIGS. 6A to 6C show schematic views of color feature of an image in accordance with the embodiment of the present invention.
Figure 6B:
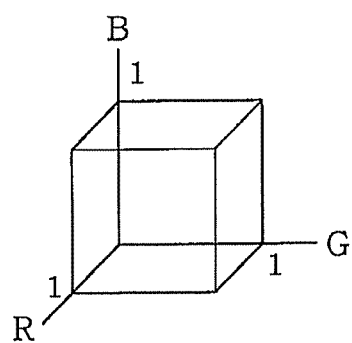
Figure 6C:

That is, when each RGB channel in RGB cube is divided in half, 8 split cubes are obtained as shown in FIG. 6A. Next, as shown in FIG. 6B, RGB of the split cube is doubled and is converted into hue information as shown in FIG. 6C. The same procedure is carried out on each of the 8 split cubes to complete a lookup table of hue for RGB.

Thus, the total values of 360° are quantized in 9 levels, and if the case with no hue information is involved, the color feature is formed of 10 levels in total.

Figure 7:
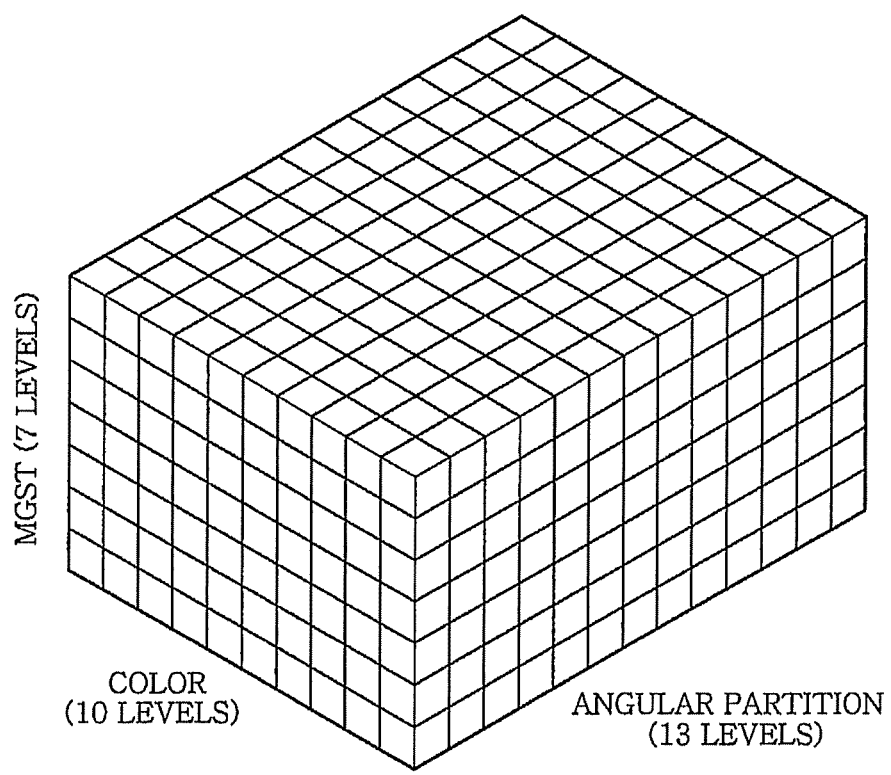
FIG. 7 provides a schematic view of a 3D histogram of 3D image identifiers in accordance with the embodiment of the present invention.

In this way, by generating the 3D image identifiers formed of MGST feature, angular partition feature and color feature for use in image search from the input image in question, three feature values are extracted for each pixel, which are then used to plot a 3D histogram, as shown in FIG. 7, by using the 3D image identifiers. Using the 3D histogram, image search can be executed between the input image in question and the reference image designated as a comparison target.

That is, after generating the 3D image identifiers for the input image in question, similarity is compared in step S210 between the input image in question and the reference image by using the 3D image identifiers, and matching is then performed in step S212 between the 3D image identifiers to search a desired image.

First, for the calculation of similarity, similarity between representative colors of the input image in question and the reference image is calculated. If the difference in similarity is above a certain level, the two images are regarded as different images. In this case, the 3D image identifier matching will not be performed.

At this time, the similarity between the representative colors is calculated by Equation 8 below in order of 5 representative color values among the color features extracted from the color feature extraction process.

$$\text{Similarity} = \sum_{i=1}^{N} (5 - |a - b|)/(a + 1 + b + 1) \quad \text{Eq. 8}$$

wherein N is a smaller value out of the number of representative colors of two images, and a and b each represent a rank of the identical color value in terms of representative colors having the identical color value in the two images. The similarity of these representative colors is utilized to primarily remove large difference values, prior to the subsequent 3D image identifier matching using the 3D histogram.

Next, the 3D image identifier matching is carried out on two images that are determined to have a high similarity with the difference in similarity below a certain level.

That is, a 3D histogram shown in FIG. 7 is plotted by extracting the 3D image identifiers for each pixel of the input image in question and, then, the 3D histogram of the input image in question and that of the reference image are matched by pixels to calculate a distance therebetween. Based on the calculated distance, it is then decided whether the input image in question is similar to the reference image, and if so, a decision result on the input image.

Here, the distance, Dist(Q, R), of the 3D histogram matching is calculated by Equation 9 below:

$$Q = \{q_{111}, q_{112}, \ldots, q_{lmn}\}, R = \{r_{111}, r_{112}, \ldots, r_{lmn}\} \quad \text{Eq. 9}$$

$$Dist(Q, R) = \frac{\sum_{l=1}^{7} nd_l}{\sum_{l=1}^{7} c_l},$$

$$nd_l = 0 (\text{if } s_l = 0), d_l / s_l \text{ (otherwise)}$$

$$c_l = 0 (\text{if } s_l = 0), 1 \text{ (otherwise)}$$

$$d_l = \sum_{m=1}^{13} \sum_{n=1}^{10} |q_{lmn} - r_{lmn}|, s_l = \sum_{m=1}^{13} \sum_{n=1}^{10} (q_{lmn} + r_{lmn})$$

wherein, Q and R each are one dimensional arrangement of the 3D histogram of each of the two images (the input image in question and the reference image), and l, m and n each are an index of the symmetry feature, angular partition feature and color feature. The maximum value of l is 7, the maximum value of m is 13, and the maximum value of n is 10.

The distance in 3D histogram matching needs to be calculated each symmetry level. Therefore, d and s are first obtained for each symmetry level, thereby deriving $d_1, s_1, d_2, s_2, \ldots, d_7$ and $s_7$.

In the above equation, nd represents a difference between symmetry levels. nd of each symmetry level is obtained by dividing the sum of distances for each level by the sum of samples, i.e., $nd_1 = d_1/s_1$ obtained. Once nd values for all levels are obtained, the final distance between two becomes $nd_1 + nd_2 + nd_3 + \ldots + nd_7/7$, which is the average of 7 distances.

As discussed above, the present invention enables to search images from digital contents, such as UCC or the like, including diverse geometrical transformation, by generating 3D image identifiers of a 3D histogram structure which is the combination of MGST features, angular partition features and color features, and matching between 3D image identifiers, so that it is possible to search a diverse and a large amount of still images including geometrical transformation at high speed, and search a desired UCC out of a vast amount of image database, or UCC images circulated over the Internet at high speed in an efficient manner.

Further, digital pictures of diverse versions can be managed, and even when the intrinsic image features such as the size, form or quality of an image may vary depending on the type of Internet or reproduction device, the identifier which is a common feature of the transformed images can be used to manage the images as the same picture group.

Moreover, when it is discovered through the search of illegal image contents that someone has illegally circulated a copy image produced by arbitrarily processing, editing and forming an original image, the present invention enables to search and discern those illegal copies from the original.

While the invention has been shown and described with respect to the preferred embodiments, it will be understood by those skilled in the art that various changes and modification may be made without departing from the scope of the present invention as defined in claims.

What is claimed is:

1. An image searching method, comprising: resizing an input image in question; generating 3D image identifiers for each pixel from the resized input image in question, the 3D image identifiers being representative of a common feature of transformation of the input image;
   performing an image search by comparing a reference image with the input image in question using the 3D image identifiers; wherein said generating the 3D image identifiers includes: extracting a Modified Generalized Symmetry Transform (MGST) feature of the input image in question;
   extracting an angular partition feature of the input image in question; and
   extracting a color feature of the input image in question.

2. The image searching method of claim 1, wherein said resizing the input image includes:
   extracting a black-and-white image and a color image from the input image in question; resizing the black-and-white image; and resizing the color image.

3. The image searching method of claim 2, wherein the black-and-white image is resized by bi-cubic interpolation.

4. The image searching method of claim 2, wherein said resizing the color image includes:
   dividing the input image in question into three channel images; resizing each of the three channel images by bi-cubic interpolation; and matching the resized three channel images with each other again to resize the color image.

5. The image searching method of claim 1, wherein said extracting the MGST feature includes:
   classifying pixel pairs which are symmetrically disposed about the central pixel in a certain area within the input image in question; and accumulating a degree of symmetry for each of the pixel pairs to calculate the MGST feature.

6. The image searching method of claim 5, wherein the MGST feature is divided by quantization in 7 levels.

7. The image searching method of claim 1, wherein the angular partition feature is divided by quantization in 13 levels.

8. The image searching method of claim 1, wherein said extracting the color feature includes:
- obtaining an average RGB value of a 3×3 area about each pixel of the input image in question; and
- segmenting the average RGB value for mapping to a hue value in hue saturation intensity color space.

9. The image searching method of claim 8, wherein the hue value is divided by quantization in 10 levels.

10. The image searching method of claim 1, wherein said performing the image search includes:
- calculating a similarity between representative colors of the input image in question and the reference image; and
- if the similarity is above a predetermined level, matching the 3D image identifiers for each of the representative colors of the input image in question and the reference image.

11. The image searching method of claim 10, wherein the representative colors of the input image in question are composed of 5 representative colors selected out of colors extracted from the input image in question as the color feature.

12. The image searching method of claim 10, wherein said matching the 3D image identifiers includes:
- extracting the 3D image identifiers of each of the input image in question and the reference image; and
- calculating a distance between 3D image identifiers of pixels for the 3D image identifiers of each of the two images for matching there between.

13. The image searching method of claim 12, wherein the 3D image identifiers are configured in a 3D histogram structure.

14. The image searching method of claim 1, wherein the input image in question is a user created contents image.

15. A non-transitory computer-readable storage medium including computer executable instructions, wherein the instructions, when executed by a
- processor, cause the processor to perform an image searching method, the method comprising: resizing a size of an input image in question; generating 3D image identifiers from the resized input image in question, the 3D image identifiers being representative of a common feature of transformation of the input image;
- performing an image search by comparing a reference image with the input image in question using the 3D image identifiers; wherein said generating the 3D image identifiers includes:
- extracting a Modified Generalized Symmetry Transform (MGST) feature of the input image in question;
- extracting an angular partition feature of the input image in question; and extracting a color feature of the input image in question.

16. The non-transitory computer-readable storage medium of claim 15, wherein said resizing to the input image includes:
- extracting a black-and-white image and a color image from the input image in question; resizing the black-and-white image; and resizing the color image.

17. The non-transitory computer-readable storage medium of claim 15, wherein said performing the image search includes:
- calculating similarity between representative colors of the input image in question and a reference image; and
- if the similarity is above a predetermined level, match the 3D image identifiers for the two images.

18. The non-transitory computer-readable storage medium of claim 15, wherein the 3D image identifiers are configured in a 3D histogram structure.

* * * * *